(12) United States Patent
Vaidya et al.

(10) Patent No.: US 8,883,887 B2
(45) Date of Patent: Nov. 11, 2014

(54) SULFUR-MODIFIED ASPHALT EMULSION AND BINDER COMPOSITIONS

(71) Applicant: Saudi Arabian Oil Company, Dhahran (SA)

(72) Inventors: Milind M. Vaidya, Dhahran (SA); Anwar H. Khawajah, Dhahran (SA); Jean-Pierre R. Ballaguet, Dhahran (SA); Laurand Lewandowski, Tampa, FL (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/661,310

(22) Filed: Oct. 26, 2012

(65) Prior Publication Data
US 2013/0104776 A1    May 2, 2013

Related U.S. Application Data

(60) Provisional application No. 61/551,648, filed on Oct. 26, 2011.

(51) Int. Cl.
| C08L 95/00 | (2006.01) |
| C08L 91/06 | (2006.01) |
| C08B 16/00 | (2006.01) |

(52) U.S. Cl.
CPC .............. *C08L 95/00* (2013.01); *C08L 95/005* (2013.01); *C08L 91/06* (2013.01); *C08L 2555/22* (2013.01); *C08L 2555/28* (2013.01); *C08L 2555/54* (2013.01); *C08L 2555/72* (2013.01); *C08L 2555/32* (2013.01)
USPC .............. 524/59; 106/660; 106/671; 523/401

(58) Field of Classification Search
CPC ........ C04B 24/36; C04B 16/02; C04B 24/24; C04B 16/00; C08L 95/00; C08L 95/005; C08L 95/06; C08L 91/00; C08B 16/00
USPC ...................... 106/660, 671; 524/59; 523/401
See application file for complete search history.

(56) References Cited

U.S. PATENT DOCUMENTS

| 4,211,575 | A | 7/1980 | Burris |
| 4,298,397 | A | 11/1981 | Burris |
| 4,339,277 | A | 7/1982 | Schult et al. |
| 4,475,953 | A | 10/1984 | Ludwig et al. |
| 5,494,966 | A * | 2/1996 | Hesp et al. .................. 525/54.5 |
| 5,618,862 | A | 4/1997 | Germanaud et al. |
| 5,880,185 | A | 3/1999 | Plance et al. |
| 6,011,095 | A | 1/2000 | Planche et al. |
| 6,133,351 | A | 10/2000 | Hayner |
| 6,380,284 | B1 | 4/2002 | Lopez |
| 7,037,961 | B2 | 5/2006 | Rivas et al. |
| 7,213,446 | B2 | 5/2007 | Barnat |
| 7,357,594 | B2 | 4/2008 | Takamura |
| 7,902,277 | B2 | 3/2011 | Reinke et al. |
| 7,981,466 | B2 | 7/2011 | Reinke et al. |
| 2002/0058734 | A1 | 5/2002 | Harlan |
| 2007/0082973 | A1 | 4/2007 | Albrecht et al. |
| 2011/0196073 | A1 * | 8/2011 | Fee et al. .................. 524/68 |

OTHER PUBLICATIONS

Anonymous, Asphalt Emulsion Technology, Review of Asphalt Emulsion Residue Procedures, E-C122, Transportation Research Circular E-C122, Oct. 1, 2007, pp. 1-34, XP05504865.*
G. Sholar et al, Preliminary Investigation of a Test Method to Evaluate Bond Strength of Bituminous Tack Coats, research Report, Oct. 1, 2002, pp. 1-47, XP05504865.*
D. Timm et al, Evaluation of Mixture Performance and Structural Capacity of Pavements using Shell Thiopave, NCAT Report 09-05, Sep. 2005, pp. 1-96, XP00259400.*
Anonymous, Asphalt Emulsion Technology, Review of Asphalt Emulsion Residue Procedures, E-C122, Transportation Research Circular E-C122, Oct. 1, 2007, pp. 1-34, XP055048654.
G. Sholar et al, Preliminary Investigation of a Test Method to Evaluate Bond Strength of Bituminous Tack Coats, research Report, Oct. 1, 2002, pp. 1-47, XP055048657.
Anonymous, Performance Based Emulsion Testing—Residue Testing, AEMA-ARRA-ISSA Annual Meeting, Florida, USA, Mar. 5, 2010, pp. 1-25, XP055048730.
D. Timm et al, Evaluation of Mixture Performance and Structural Capacity of Pavements using Shell Thiopave, NCAT Report 09-05, Sep. 2005, pp. 1-96, XP002594002.
Fitts G.L, Sulphur's Place in CE, Internet Citation, Feb. 18, 2009, pp. 1-36, XP002594003.
Saleem J, Sulfur Modification of Polymers for Use in Asphalt Binders, Internet Citation, Jun. 1, 2008, pp. 1-2,I, XP002594542.
Kadrmas A, Asphalt Emulsion Residue Recovery and Rheological Testing Update, Presentation to AEMA ITC at 2010 Annual Meeting.
Lewandowski L, Performance Based Emulsion Testing—Residue Testing; AEMA-ARRA-ISSA Annual Meeting, Mar. 5, 2010.
PCT/US2012/062036 Search Report Written Opinion mailed Jan. 17, 2013.
Rosner et al, Investigation into the Nature of Emulsified Asphalts Compatible with California with California Local Aggregates and Substitution of Sulfur for Asphalt in Aqueous Emulsified Systems, Research Project, 1982, A9-142-31 Report California Air Resources Board.

* cited by examiner

*Primary Examiner* — Michael M Bernshteyn
(74) *Attorney, Agent, or Firm* — Bracewell & Giuliani LLP; Constance G. Rhebergen; James M. Sellers (57) ABSTRACT

A Performance Grade sulfur-extended asphalt binder emulsion is made by combining a viscosifier, an emulsifier, a Performance Grade sulfur-extended asphalt binder, optionally a saponification agent, and a base aqueous solution. During creation of the asphalt emulsion, none of the components or combinations of them exceeds 275° F. The Performance Grade sulfur-extended asphalt binder composition is made by combining free or element sulfur, a linear alkane material, optionally a saturated-backbone polymer modifier, optionally a non-aqueous acid, and a base asphalt. The disclosed Performance Graded sulfur-extended asphalt binder and Performance Graded asphalt sulfur-extended asphalt binder emulsion allow operators using these products directly or in combination with aggregates and other materials to mix and blend the compositions, and apply the compositions in the field, at temperatures less than 300° F.

48 Claims, 1 Drawing Sheet

SULFUR-MODIFIED ASPHALT EMULSION AND BINDER COMPOSITIONS

CROSS-REFERENCE TO RELATED PATENT APPLICATIONS

This application claims priority from U.S. Provisional Application No. 61/551,648, filed Oct. 26, 2011. For purposes of United States patent practice, this application incorporates the contents of the Provisional Application by reference in its entirety.

BACKGROUND OF THE INVENTION

1. Field of the Invention

The field of invention relates to asphalt binder and emulsion compositions. More specifically, the field relates to sulfur-extended asphalt binders (SEABs) and sulfur-extended asphalt binder emulsions (SEABEs).

2. Description of the Related Art

During the manufacturing and processing of materials containing asphalt such as asphalt-coated aggregates and hot asphalt mixes, working temperatures above 300° F. can cause problems for workers and their equipment. At temperatures greater than 300° F., sulfur and sulfur compounds present in asphalt or bitumen mix, such as elemental sulfur and naturally present heterorganic compounds, typically begin to react with other constituents in the asphalt and with the air. One of the main products of the sulfur reactions is hydrogen sulfide gas. Hydrogen sulfide in low quantities is an irritant, but in high quantities is toxic to humans. Similarly, heated sulfur that oxidizes in air forms sulfur dioxide, which has a noxious odor and is an air pollutant.

Sulfur, especially "free" or "elemental" sulfur, is an abundant and inexpensive material. Elemental sulfur is a byproduct of non-sweet natural gas and petroleum processing. Sources of free sulfur include petroleum refineries and gas sweetening plants. Because of the quantity of sulfur extracted from natural gas and petroleum, many sulfur producers consider elemental sulfur a waste product.

Others have attempted to use waste sulfur as an expander or filler for asphalt binders, but only with limited success. These efforts have only been successful in incorporating a small amount of sulfur into the asphalt binder, typically only up to a few percent of the total composition.

Those skilled in the art understand that sulfur forms hydrogen sulfide ($H_2S$) gas, which is toxic to humans, starting at around 305° F. At and above that temperature, free sulfur in hydrocarbon environments dehydrogenates hydrocarbons and forms hydrogen sulfide. Heating sulfur to high temperatures in the presence of oxygen forms sulfur dioxide, which is noxious to humans and is an air pollutant. It is desirable to find a combination of asphalt materials that are workable at temperatures below 300° F. for worker comfort and safety as well as being more to the environment.

It is also desirable to find commercial uses for elemental sulfur. Incorporating sulfur into commercial products can transform what many consider a potential "waste" product into a product that has practical value.

SUMMARY OF THE INVENTION

A Performance Grade sulfur-extended asphalt binder emulsion includes a viscosifier in a range of from about 0.1% to about 3%, an emulsifier in a range of from about 0.1% to about 5%, a base aqueous solution in a range of from about 21.7% to about 89.8%, and a Performance Grade sulfur-extended asphalt binder in a range of from about 10% to about 70% by total weight of the emulsion. The Performance Grade sulfur-extended asphalt binder is made by combining a free sulfur in a range of from about 10% to about 50%, a linear alkane material in a range of from about 0.1% to about 5%, and a base asphalt in a range of from about 38% to about 89.9% by total weight of the asphalt binder composition at a temperature not to exceed 275° F. The Performance Grade sulfur-extended asphalt binder emulsion is maintained at a temperature not to exceed 275° F. The asphalt emulsion is operable to maintain storage stability for at least about a 3 hour period as determined using the ASTM D 244 testing method. An embodiment of the emulsion includes a saponification agent in a range of from about 0.1% to about 0.3% of the total weight of the asphalt emulsion. An embodiment of the emulsion has a storage stability value of 0.0 for a 24-hour period as determined using the ASTM D 244 testing method.

A Performance Grade sulfur-extended asphalt binder emulsion residue is made by treating the Performance Grade sulfur-extended asphalt binder emulsion using the Texas Department of Transportation Evaporation Recovery Procedure. An embodiment of the emulsion residue includes trackless tack coatings.

A Performance Grade sulfur-extended asphalt binder composition includes a free sulfur in a range of from about 10% to about 50%, a linear alkane material in a range of from about 0.1% to about 5%, and a base asphalt in a range of from about 38% to about 89.9% by total weight of the asphalt binder composition. The Performance Grade sulfur-extended asphalt binder is maintained at a temperature not to exceed 275° F. An embodiment of the asphalt binder composition includes The disclosed Performance Graded sulfur-extended asphalt binder and Performance Graded asphalt sulfur-extended asphalt binder emulsion allow operators using these products directly or in combination with aggregates and other materials to mix and blend the compositions, and apply the compositions in the field, at temperatures well below 300° F. The reduced mixing and application temperatures significantly limit the probability of forming hydrogen sulfide and sulfur dioxide. This, in turn, improves asphalt binder and asphalt binder emulsion user safety as well as reduces negative environmental impacts of using products with significant amounts of free sulfur incorporated therein.

The reduced operating temperature also contributes to greater economic efficiency. The disclosed Performance Graded sulfur-extended asphalt binders and Performance Graded asphalt emulsions can maintain sub-300° F. manufacturing and working temperatures. At these reduced temperatures, they require less energy during formation and application versus traditional hot mix asphalt materials that require maintaining temperatures greater 300° F.

The Performance Graded sulfur-extended asphalt binder and the Performance Graded asphalt sulfur-extended asphalt binder emulsion are significant commercial and practical outlets for "waste" sulfur. The asphalt composition meets and exceeds The American Association of State Highway and Transportation Officials (AASHTO) Performance Graded Asphalt Binder Specification M 320-10 (dated 2010) (hereinafter "M 320"). PG-rated asphalt binder and emulsion are suitable commercially for roadway and highway repair and construction projects, which use extensive amounts of asphalt-based materials. The Performance Graded sulfur-extended asphalt binder contains at least 10% and up to 50% by weight free sulfur. The major component of Performance Graded asphalt sulfur-extended asphalt binder emulsion is Performance Graded sulfur-extended asphalt binder.

The properties of the disclosed Performance Graded sulfur-extended asphalt binder and the Performance Graded asphalt sulfur-extended asphalt binder emulsion are especially suited for warmer climates. The disclosed asphalt binder and asphalt binder emulsion show improvements in certain desirable physical and chemically related properties over base asphalt materials.

BRIEF DESCRIPTION OF THE DRAWINGS

These and other features, aspects, and advantages of the present invention are better understood with regard to the following Detailed Description of the Preferred Embodiments, appended Claims, and accompanying FIGURE, where:

DETAILED DESCRIPTION OF THE PREFERRED EMBODIMENTS

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. "Optionally" and its various forms means that the subsequently described event or circumstance may or may not occur. The description includes instances where the event or circumstance occurs and instances where it does not occur.

Spatial terms describe the relative position of an object or a group of objects relative to another object or group of objects. The spatial relationships apply along vertical and horizontal axes. Orientation and relational words are for descriptive convenience and are not limiting unless otherwise indicated.

Where a range of values is provided in the Specification or in the appended Claims, it is understood that the interval encompasses each intervening value between the upper limit and the lower limit as well as the upper limit and the lower limit. The invention encompasses and bounds smaller ranges of the interval subject to any specific exclusion provided.

All publications mentioned in the Specification are incorporated by reference to disclose and describe the methods or materials, or both, in connection with which the publications are cited. The publications discussed in the Specification are provided solely for their disclosure prior to the filing date of the present application. Nothing is to be construed as an admission that the invention is not entitled to antedate such publication by virtue of prior invention. Further, the date of publication for the publication may be different from the actual publication date, which may require independent confirmation.

Where reference is made in the Specification and appended Claims to a method comprising two or more defined steps, the defined steps can be carried out in any order or simultaneously except where the context excludes that possibility.

Performance Grade Asphalt Sulfur-Extended Asphalt Binder

Performance Grade (PG) sulfur-extended asphalt binder (SEAB) emulsions (E) are made of PG SEAB, a viscosifier, a emulsifier, and a base aqueous fluid. An embodiment of the PG SEABE includes a saponification agent.

A PG sulfur-extended asphalt binder is the reaction product of base asphalt material, free sulfur and a linear alkane material. An embodiment includes an acid. Another embodiment includes a saturated-backbone polymer modifier.

Performance Grade Sulfur-Extended Asphalt Binder

PG SEAB is the product of several asphalt binder components that react during the blending process. A PG SEAB is made of base asphalt, elemental sulfur and at least one linear alkane material. An embodiment includes acid. Another embodiment includes a saturated-backbone polymer modifier.

Base Asphalt

A PG SEAB includes a base asphalt material. Bitumens useful as base asphalt material can originate from petroleum distillation (e.g., vacuum tails); coal, tar sands or oil shale processing; or from naturally occurring sources (e.g., Trinidad Lakes). The base asphalt material can be a singular material or a blend of several base asphalts.

All asphalts contain asphaltenes. Asphaltenes include clusters of large polycyclic aromatic molecules. The structure of asphaltenes may include, in no particular order or regularity, cyclo-alkanes, cyclo-alkenes, and alkane and alkene chains extending from polycyclic molecules for up to 30 carbons ($C_{30}$) in length. Asphaltenes can also have functional moieties that are capable of reacting with other materials. Functional moieties include alcohols, carboxylic acids, ketones, phenols, amines, amides, sulfides, sulfoxides, sulfones, sulfonic acids, and porphyrin rings chelated with vanadium, nickel, and iron. Asphaltenes can also have heterorganic aromatic rings part of their overall polycyclic structure, including benzothiophene, pyrrole and pyridine rings.

Asphalt is a colloidal dispersion of asphaltenes in a maltenes phase. The maltenes phase, which is more mobile than the asphaltene phase, comprises asphaltene resins, polar and non-polar aromatics, cyclic saturated hydrocarbons (e.g., naphthenes), and both straight and long-chain saturated hydrocarbons. Although not intending to be bound by theory, it is believed that the polar aromatics in the maltene phase tend to be the dispersing agent for the asphaltenes, interacting with polar functional groups that can exist on asphaltenes. One so inclined can at least partially extract maltenes from the dispersion using an n-alkane-based solvent; asphaltenes resist such treatment.

All asphalts containing asphaltenes are suitable as the base asphalt in the PG SEAB. Asphaltene concentration can vary in amount and functionality depending on the source of the base asphalt. The asphaltene content of the base asphalt is in the range of from about 0.01% by weight to about 30% by weight of the base asphalt. Suitable base asphalts include those asphalts capable of being "Performance Graded" using the Performance Grade table ("Table 1") of the AASHTO Performance Graded Asphalt Binder Specification M 320.

Elemental Sulfur

The PG SEAB also contains "free" or elemental sulfur. The elemental sulfur can comprise not only singular sulfur atoms but also sulfur in complexes and covalently bonded to other sulfur atoms, including α-sulfur (orthorhombic sulfur), β-sulfur (monoclinic sulfur), and "catena" sulfur. Chains or rings of sulfur atoms can range from a few sulfur atoms to hundreds of covalently linked sulfur atoms. All allotropes of elemental sulfur are suitable for use in the PG SEAB. Because of the wide variety of allotropes, elemental sulfur is found in many different solid and liquid forms, and can change between forms based upon modifications to its environment.

Sulfur covalently bonded with non-sulfur atoms, such as carbon, hydrogen or other atomic species, including heterorganic compounds, is not "free" or elemental sulfur.

The source of elemental sulfur can be naturally occurring or the resultants and residue from natural gas and petroleum production and treatment processes. For example, natural gas sweetening processes often include hydrogen sulfide to elemental sulfur conversion units ("Claus units").

Elemental sulfur should not contain any significant amounts of impurities. Salts, halogens and heterorganic compounds can interfere with the reactions occurring within the SEAB component mixture.

Linear Alkane Material

The PG SEAB also includes a linear alkane material. The linear alkane material is an unbranched alkane of the general chemical formula $C_nH_{2n+2}$, where "C" is the Periodic Table of Elements symbol for carbon, "H" is the symbol for hydrogen, and n is an integer with a value in a range of from about 18 to about 150.

Linear alkane materials can be naturally occurring or synthetic in origin. They can be purified materials or blends of several linear alkanes with carbon counts from about C18 to about C150. Blends of linear alkane materials include bituminous paraffin waxes, which are unbranched alkanes having a carbon count in a range of from about C25 to about C70. Bituminous paraffin waxes have a melting range of from about 80° F. to about 170° F., depending on the blend and types of linear alkanes. Other sources of suitable linear alkane materials include Fischer-Tropsch waxes, ceresin waxes, montan waxes, ozocerite, peat waxes, paraffin waxes, microcrystalline wax, petroleum jelly, non-paraffin wax, natural wax, carnuba was, bees wax, candelilla wax, shellac wax, castor wax, rice wax, modified natural waxes, partially synthetic waxes, polyethylene waxes, polymerized α-olefin waxes, substituted amide waxes and chemically modified waxes, where the waxes are modified with esters or saponification agents.

A commercially available linear alkane material includes SASOBIT (Sasol Wax Americas; Shelton, Conn.), which is a non-paraffinic linear alkane Fischer-Tropsch wax. These materials reportedly have a carbon count in a range of from about C40 to greater than C100 and a melting point range of from about 185° F. to about 239° F.

Saturated-Backbone Polymer Modifier

An embodiment of the PG SEAB includes a polymer modifier having a saturated carbon backbone. The carbon backbone of the polymer modifier is a chain of carbon atoms that have single covalent bonds from which all other moieties and functional groups pend. Saturated-backbone polymer modifiers include homopolymers, copolymers, terpolymers, tetrapolymers, and higher order polymer combinations. The distribution pattern of repeating polymerized monomer units includes random, alternating, di-blocks, tri-blocks, tetrablocks, grafted-blocks, and other distribution combinations. The saturated-backbone polymer modifiers can have no side branching, short-chain branches or long-chain branching.

Example monomers useful for forming saturated-backbone polymer modifiers include linear alpha olefins such as ethylene, propylene, 1-butene, 1-hexene, 1-octene and other olefins with a carbon count up to about 30; other non-alpha mono-olefins, including isobutylene, isohexene, 2-hexene, 2-octene, 3-octene; acrylates and butylacrylates; maleic anhydride; fumarates; maleate esters; (meth)acrylate esters, including glycidyl methacrylate and hydroxyethyl methacrylate; (meth)acrylic acid; and p-methylstyrene.

Reactive functional groups on the saturated-backbone polymer modifier can react and form covalent bonds with corresponding functional groups on other PG SEAB constituents. Known methods for modifying the polymer to include such groups includes grafting, block addition, and incorporating monomers already comprising reactive moieties. The reactive functional groups can react with free sulfur and reactive moieties in the base asphalt material. The functional groups can become reactive under different process conditions, including elevated temperatures, the presence of a catalyst, or in an acidic or alkaline medium. Reactive functional groups include primary and secondary alcohols, primary and secondary amines, acid anhydrides, epoxides, and parts of other molecules that have unsaturated carbons (i.e., double and triple-bonded carbons).

An example of a commercially available saturated-backbone polymer modifier is an elastomeric terpolymer sold under the name ELVALOY (E.I. du Pont de Nemours and Co.; Wilmington, Del.), including ELVALOY AM, 4170 and 1050. Although not intending to be bound by theory, such terpolymers comprise repeating units derived from the terpolymerization of ethylene, butyl acrylate, and glycidyl methacrylate monomers. The glycidyl moiety can bind to reactive functionalities present in asphalts via epoxide reaction.

Non-Aqueous Acid

An embodiment of the PG SEAB includes a non-aqueous acid. Acids promote covalent bonding reactions between reactive functional groups found in the asphalt binder components, including those found on the saturated-backbone polymer modifier and the base asphalt. The non-aqueous acid can also facilitate reactions between the free sulfur and the other asphalt binder components.

For the PG SEAB, useful non-aqueous acids include phosphoric acids. Phosphoric acids include polyphosphoric (PPA) and superphosphoric acids (SPA). Polyphosphoric acids are oxyacids of phosphorous having the general chemical formula $H(PO_3H)_nOH$, where "P" is the Periodic Table symbol for phosphorus, "H" is the Periodic Table symbol for hydrogen, "O" is the Periodic Table symbol for oxygen, and n is an integer representing the number of phosphoric units in the molecule. Commercial mixtures of PPAs have blends of ortho- (n=1), pyro- (n=2), tri- (n=3), tetra- (n=4) and higher-order condensed chain acids. Preferred PPA concentrations are in the range of from about 95% to about 118% phosphoric acid ($H_3PO_4$) concentration equivalents, which represents the equivalent amount of phosphoric acid that forms upon complete hydrolysis of the polyphosphoric acid.

Performance Grade Sulfur-Extended Asphalt Binder Composition Range

PG SEAB is the product of a reactive combination of free sulfur in a range of from about 10% to about 50% by weight of the total binder composition, the linear alkane material in a range of from about 0.1% to about 5% by weight of the total binder composition, and a base asphalt in a range of from about 38% to about 89.9% by weight of the total binder composition. The Performance Grade sulfur-extended asphalt binder is maintained at a temperature not to exceed 275° F.

In an embodiment of the PG SEAB including the saturated-backbone polymer modifier, it is present in a range of from about 0.1% to about 5% by total weight of the asphalt binder composition.

In an embodiment of the PG SEAB that includes the non-aqueous acid, it is present in a range of from about 0.1% to about 2% by total weight of the asphalt binder composition.

Producing Performance Grade Sulfur-Extended Asphalt Binder

Addition and blending of components to form a PG SEAB can occur in any order. A non-limiting example includes adding components individually to a pre-heated and stirred base asphalt material. Addition of the other PG SEAB components can occur individually or together.

Blending occurs in vessels or apparatuses of appropriate combined volume to contain all of the asphalt binder components together. One or more vessels or apparatuses can blend various intermediate blend combinations depending on the components incorporated. The blending apparatus helps maintain the base asphalt and the intermediate blends at temperatures no greater than 275° F., which is warm enough to permit the base asphalt to reach a molten state but not hot enough to cause the formation of hydrogen sulfides and sulfur dioxides from reactions involving free sulfur or heterorganic sulfur-bearing molecules. A blending device induces circulation in the molten base asphalt and the intermediate blends to ensure incorporation of the asphalt binder components during addition.

When adding asphalt binder components to one another, intermediate blends form. After each PG SEAB component addition, it is preferable that the intermediate blend continue combining for a period to ensure homogeneous or homogeneous-like incorporation. The time required for combining a particular asphalt binder component into the base asphalt or an intermediate blend depends on the miscibility and form of the asphalt binder component added and its miscibility with the base asphalt or the intermediate blend at the temperature of mixing. Some components may require metering into the heated base asphalt or intermediate blend to ensure incorporation. The combining of each asphalt binder component into an intermediate blend or mixture typically takes from about a minute to about an hour. One of ordinary skill in the art recognizes the appropriate amount of time to permit a particular asphalt binder component to combine into a homogenous intermediate blend.

Suitable vessels and apparatuses pre-heat and combine the asphalt binder components together into intermediate blends. Such suitable vessels and apparatuses include metal cans with hand blenders, reactors, buckets, mixing bowls, tanks and low- or high-shear mixing processors. One of ordinary skill in the art is capable of selecting the appropriate apparatus or vessel for combining asphalt binder components. It is preferable to use a vessel or apparatus, or series of vessels or apparatuses, that permits shear mixing of the intermediate blends to ensure homogeneous component incorporation where a level of immiscibility exists.

The temperature of the base asphalt and intermediate blends can vary somewhat during the heating and mixing processes; however, the temperature of the base asphalt and the intermediate blends does not exceed 275° F. at any point during the PG SEAB production process. In addition, the temperature of the individual asphalt binder components before addition into intermediate blends does not exceed 275° F. Limiting the temperature prevents formation of hydrogen sulfide and sulfur dioxide gases, which can be harmful to those individuals performing blending operations. Maintaining a lower temperature also prevents undesirable chemical reactions between the asphalt binder components until full incorporation in a final blend.

Upon the addition and combination of all the asphalt binder components, including any optional components, a final intermediate mixture forms. The final intermediate blend continues combining and agitation at a temperature no greater than 275° F. for a sufficient period for the formation of the Performance Grade sulfur-extended asphalt binder, including a period in a range of from about 5 minutes to about 2 hours. It is preferable that the agitation occurs only for as long as necessary to create the PG SEAB. Agitation using low or high-shear mixing is preferable; however, it is expected that upon addition of sulfur to the base asphalt material that high-shear mixing is required. One of ordinary skill in the art recognizes the appropriate amount of time to permit formation of the asphalt binder from the final intermediate blend without undue experimentation.

Performance Grade Sulfur-Extended Asphalt Binder Reactions

Although not intending to be bound by theory, it is believed that during the agitation of the final intermediate blend at temperature that one or more chemical reactions occurs that result in the formation of the PG SEAB and the manifestation of its desirable properties. Those in the art know that sulfurization of the reactive moieties on the base asphalt and, if present, on the saturated-backbone polymer modifier can occur at temperatures at or below 275° F. In such instances, the free sulfur chemically reacts with saturated carbons near unsaturated bonds. Free sulfur can react with sulfur-reactive moieties that comprise part of the saturated-backbone polymer modifier and parts of the base asphalt, including polar-aromatic compounds in the maltene phase. Free sulfur can form polysulfide chains that cross-link parts of the base asphalt and the saturated-backbone polymer modifier. Such sulfurization reactions alters the physical characteristics of the maltene phase of the base asphalt, resulting in the base asphalt having more gel-like physical properties. When present, the phosphoric acid may also contribute to these interactions.

Some of the unbound free sulfur can dissolve into the base asphalt portion of the composition. Polar interaction with other molecules in the asphalt binder composition, including covalently bound sulfur in the base asphalt, can allow amounts of free sulfur to dissolve into the asphaltene or maltene phases. The amount of dissolved sulfur may play a role in the physical and chemical aspects of the PG SEAB.

Some of the free sulfur may coalesce and form physical or crystalline structures within the asphalt binder at amounts greater than about 20% weight percent of the PG SEAB. The aggregated free sulfur can impart mechanical properties to the asphalt binder that give the composition different properties, including modulus, that are discernible through standard asphalt industry tests. The changes to the physical behavior and testing response compared to the base asphalt material are desirable.

Reactive functional moieties on the saturated backbone polymer modifier, when present in the PG SEAB composition, can covalently bond with other saturated backbone polymer modifiers and the base asphalt material. Covalent bonds between the saturated backbone and the base asphalt can generate a cross-linked network of large asphaltene macromolecules, which can form large 3-dimensional networks of macromolecules. The interlinked macromolecules can sterically hinder relative movement of other components, including free sulfur and the linear alkane material, further modifying the properties of the PG SEAB.

Viscosifier

The PG SEAB emulsion includes a viscosifier to provide thickness and support to suspended solids and viscous liquids.

Useful viscosifiers include cellulose-based rheology modifiers, which include ethyl hydroxyethyl cellulose (EHEC), hydroxyethyl cellulose (HEC) and hydroxy propyl methyl cellulose. Examples commercial cellulose-based modifiers include NATROSOL HEC 250HHR (Hercules Inc.; Wilmington, Del.); BERMOCOLL E 431 FQ, E 511 X, EBM 8000, CCM 894, EHM 500, and M 800 X (Akzo Nobel Functional Chemicals AB; Stenungsund, Sweden); and BENECEL K200M (Ashland Aqualon Functional Ingredients; Wilmington, Del.). A known useful commercial viscosifier includes BERMOCOLL EM 7000 FQ (Akzo Nobel Functional Chemicals AB; Stenungsund, Sweden), a non-ionic ethyl methyl hydroxyethyl cellulose.

Other useful viscosifiers also include non-cellulose rheology modifiers. Non-cellulose-based aqueous rheology modifiers include BERMODOL PUR 2150 (Akzo Nobel Functional Chemicals; Brewster, N.Y.) and ALCOGUM L 265 (Akzo Nobel Surface Chemistry LLC; Chicago, Ill.). BERMODOL PUR 2150 contains polyurethanes and ethoxylated/propoxylated alcohols. ALCOGUM L 265 contains acrylate-based emulsion copolymers.

Emulsifier

The PG SEAB emulsion includes an emulsifier to provide chemical stability to the water/asphalt binder formulation until application of the emulsion to a surface. Upon application, the asphalt emulsion breaks and the previously emulsified asphalt aggregates on the applied surface, forming a residue layer of asphalt binder cement.

The PG SEAB can use anionic, cationic and non-ionic emulsifiers. Preferably, the asphalt emulsion incorporates either an anionic or a cationic emulsifier as the emulsifying agent. Useful anionic emulsifiers include fatty acids and oils. Anionic emulsifiers in an aqueous solution containing alkaline materials can form saponified emulsions. Useful cationic emulsifiers include fatty diamines, polyamines and modified tallow amines. Cationic emulsifiers in an aqueous solution containing acidic materials can form saponified emulsions. Non-ionic emulsifiers, including some ethoxylated alcohols and alkyl phenol ethoxylates, can operate to produce emulsions by themselves or in conjunction with both anionic and cationic emulsifiers.

Examples of commercial emulsifiers include REDICOTE E-7600 (Akzo Nobel Surface Chemistry LLC; Chicago, Ill.), which is an emulsifier for slow-setting anionic asphalt emulsions ("SS"); REDICOTE E-9, EM33, E-70, and E-7000 products (Akzo Nobel Surface Chemistry LLC; Chicago, Ill.); ASFIER N-400LN (Kao Corp.; Tokyo, Japan); and TERGITOL NP-40 and NP-70 (Dow Chemical; Midland, Mich.).

Saponification Agent

An embodiment of the PG SEAB emulsion includes a saponification agent. The saponification agent assists in stabilizing the PG SEAB emulsion by transforming the asphalt emulsion into a saponified asphalt emulsion. In conjunction with an appropriate amount and type of saponification agent, the anionic or cationic emulsifier in the asphalt emulsion forms a complex, which saponifies the asphalt emulsion. The saponified asphalt emulsion is physically more stable, longer lasting in suspending solids and viscous liquids, and more chemically stable in the presence of potential emulsion impurities that typically can destabilize an asphalt emulsions, such as divalent-ion containing minerals and salts. Associated alkaline saponification agents include sodium hydroxide and potassium hydroxide. Associated acidic saponification agents include aqueous solutions of hydrochloric acid.

Base Aqueous Fluid

The PG SEAB emulsion includes water for the balance of the emulsion composition to convey the asphalt binder solids. Appropriate base aqueous fluids include deionized, tap and fresh waters; unsaturated, brackish, natural, saturated, and super-saturated salt waters; natural, salt dome, petroleum production byproduct, and synthetic brines; seawater; mineral waters; and other potable and non-potable waters containing one or more dissolved salts, minerals, or organics. Preferably, the base aqueous fluid is fresh or demineralized water. Some local regulatory authorities do not permit the use of salty waters for applying asphalt emulsions due to the potential toxicity to flora and fauna of excess runoff from heavily ionized fluids. In addition, ionic species, including salts of calcium and magnesium, can destabilize asphalt emulsions using ionic emulsifiers. Such asphalt emulsions would require additional saponification agents to stabilize the emulsion.

Performance Grade Sulfur-Extended Asphalt Binder Emulsion Composition Range

The Performance Grade sulfur-extended asphalt binder emulsion includes the viscosifier in the range of from about 0.1% to about 3%, the emulsifier in the range of from about 0.1% to about 5%; the Performance Grade sulfur-extended asphalt binder in a range of from about 10% to about 70% and a base aqueous solution in a range of from about 21.7% to about 89.8% by total weight of the emulsion. The Performance Grade sulfur-extended asphalt binder is maintained at a temperature not to exceed 275° F. The Performance Grade sulfur-extended asphalt binder emulsion is maintained at a temperature not to exceed 275° F. The asphalt emulsion is operable to maintain storage stability for at least about a 3 hour period as determined using the ASTM D 244 testing method.

In an embodiment of the PG SEABE that includes the saponification agent, it is present in a range of from about 0.1% to about 0.3% by weight of the total composition.

The pH of the PG SEABE that contains saponification agent can vary. In an embodiment of the PG SEABE that includes the saponification agent, the pH is in a range of from about 9 to about 12.

Producing Performance Grade Sulfur-Extended Asphalt Binder Emulsion

Addition and mixing of components to form a PG SEABE can occur in any order. A non-limiting example includes heating separately the PG SEAB and aqueous components separately and then mixing them together under high shear at temperatures not exceeding 275° F. Component addition can occur individually or together.

Mixing occurs in vessels or apparatuses of appropriate combined volume to contain all of the asphalt emulsion components together. One or more vessels or apparatuses can mix various intermediate combinations depending on the components incorporated. For example, one vessel can heat and mix the PG SEAB and other non-water soluble components while another vessel mixes and heats the water-soluble components. The mixing apparatus maintains the temperature of the PG SEABE components at a temperature not exceeding 275° F., and in cases where water-soluble components are mixing in the base aqueous solution under 200° F. The low processing temperature avoids hydrogen sulfide and sulfur dioxide formation and emission from the PG SEAB as well as flashing of water during emulsification with the PG SEAB.

When adding emulsion components to one another, intermediate mixtures form. After each PG SEABE component addition, it is preferable that the intermediate mixture continue mixing for a period to ensure homogeneous or homogeneous-like incorporation. The time required for mixing a particular asphalt emulsion component into an intermediate mixture depends on the miscibility and form of the asphalt emulsion component added and its miscibility with the intermediate mixture at temperature of mixing. Some components may require metering into the heated intermediate mixture to ensure incorporation. The mixing of the asphalt emulsion components can take from about a minute to about an hour. One of ordinary skill in the art recognizes the appropriate amount of time to permit a particular asphalt emulsion component to mix to reach an intermediate emulsion mixture.

Suitable vessels and apparatuses pre-heat and combine the asphalt emulsion components together into intermediate mixtures. Suitable vessels and apparatuses include metal cans with hand blenders, reactors, buckets, mixing bowls, tanks, colloid mixers and low- or high-shear mixing processors. One of ordinary skill in the art is capable of selecting the appropriate apparatus or vessel for combining asphalt emulsion components. It is preferable to use a vessel or apparatus that permits shear mixing of the intermediate mixtures to ensure component incorporation.

It is important to process the asphalt emulsion components and intermediate mixtures at temperatures below 275° F. for reasons previously described. The temperature of the asphalt emulsion components and intermediate mixtures can vary somewhat during the heating and mixing processes; however, the temperatures of the PG SEAB and the intermediate mixtures do not exceed 275° F. at any point during the manufacture of the PG SEABE. Limiting the temperature prevents formation of hydrogen sulfide and sulfur dioxide gases, which can be harmful to those individuals performing mixing operations, and it prevents flashing or boiling of the asphalt emulsion.

Upon the addition and combination of all the asphalt emulsion components, including any optional components, a final intermediate mixture forms. The final intermediate mixture continues mixing and agitation at a temperature less than 200° F. for a sufficient period for the formation of the of the Performance Grade sulfur-extended asphalt binder emulsion, including a period in a range of from about 1 minute to about an hour. It is preferable that the agitation occurs only for as long as necessary to create the PG SEABE. Agitation using high-shearing or colloidal mixing is preferable. One of ordinary skill in the art recognizes the appropriate amount of time to permit formation of the asphalt emulsion from the final intermediate mixture without undue experimentation.

Use of Performance Grade Asphalt Sulfur-Extended Asphalt Binder Emulsion and Performance Grade Sulfur-Extended Asphalt Binder Because the PG SEABE incorporates PG SEAB, the quality of the residue upon breaking of the asphalt emulsion is better comparatively to simply emulsifying a mixture of a base asphalt and sulfur. The significant amount of sulfur entrained and bound in the PG SEABE formulation imparts desirable mechanical strength in the residue while maintaining overall flexibility for an extended temperature range.

PG SEAB and PG SEABE also provide a vehicle for using a significant amount of "waste" sulfur in low-temperature applications. Maintaining the temperature of the PG SEABE components, including the PG SEAB, the base asphalt and the free sulfur to manufacturing temperatures no greater than 275° F. completely prevents the hazards of forming hydrogen sulfide and sulfur oxides around workers and equipment.

PG SEABE is surprisingly stable. An embodiment of the PG SEABE remains stable for at least 24 hours at room temperature (~25° C.). An embodiment of the PG SEABE remains stable for at least 3 hours at room temperature. This stability permits easy manufacturing, transport and application to a work site of PG SEABE containing PG SEAB. In addition, no additional user training is necessary (except introduction and material safety) for using PG SEABE—it is applied using regular commercial asphalt emulsion application equipment and techniques.

PG SEABE are useful as tack coatings, including trackless tack coatings, primers for other asphalt coatings, patching and pavement repair, fog sealing, chip seals, micro surface binding, slurry seals, soil stabilization, and full depth reclamation (FDR) processes.

PG SEAB is "performance grade" using the Performance Grade table ("Table 1") of the AASHTO Performance Graded Asphalt Binder Specification M 320. PG SEAB is significantly stronger, has better temperature performance, and provides an excellent source material for moderate-temperature tack coat applications than the PG-rated base asphalt of which it is made.

PG SEAB is useful for chip seals; emulsions; repair compositions and applications for paved surfaces; roofing; waterproofing, including adhering roofing sheets to roofs or waterproofing coverings for roofing fabrics; spray coating for pipes and other industrial protection schemes, including steel and iron; track coats; and trackless tack coats.

PG SEAB is useful for blending with aggregates. PG SEAB can blend with artificial or natural aggregate such that the PG SEAB is in the range of from about 1% to about 10% by volume of the total aggregate mixture. PG SEAB/aggregate blend is useful for paved surfaces, including highways, city streets, parking lots, ports, airfields and sidewalks in a broad temperature range.

Examples of specific embodiments facilitate a better understanding of Performance Grade asphalt sulfur-extended asphalt binder emulsion and Performance Grade sulfur-extended asphalt binder. In no way should the Examples limit or define the scope of the invention.

EXAMPLES

Examples 1-3

Performance Grade Sulfur-Extended Asphalt Binders

Three Example Performance Grade (PG) sulfur-extended asphalt binders (SEABs)—Examples 1-3—are combinations of PG base asphalt, free sulfur, and a linear alkane material (SASOBIT). Examples 1 and 3 include amounts of the non-aqueous acid (PPA; 115% phosphoric acid equivalents). Examples 1 and 2 include amounts of the saturated-backbone polymer modifier (ELVALOY 1050). The values of Table 1 are in weight percent of the total PG SEAB composition.

TABLE 1

Composition of Examples 1-3 PG SEABs.
Example 1-3 PG SEAB compositions (weight % of total)

| | Base Asphalt 1 (PG 64-22) | Base Asphalt 2 (PG 64-28) | Free sulfur | PPA (115% eq.) | Polymer modifier (ELVALOY) | Linear alkane (SASOBIT) |
|---|---|---|---|---|---|---|
| Example 1 | 74.5 | — | 20.0 | 0.5 | 1.0 | 4.0 |
| Example 2 | 75.0 | — | 20.0 | — | 1.5 | 3.5 |
| Example 3 | — | 76.0 | 20.0 | 0.5 | — | 3.5 |

The temperature of the Example 1-3 PG SEAB components and intermediate blends during combination does not exceed 275° F. during any part of the PG SEAB blending process. For Example 1, 372.5 grams of PG 64-22 base asphalt heats in a suitable container to a temperature that does not exceed 275° F. for 15 minutes prior to the incorporation of other PG SEAB components. Using a Silverson Mixer operating at low shear, 5 grams of ELVALOY 1050 incorporates into the heated base asphalt and blends for 60 minutes. 2.5 grams of PPA incorporates into the heated intermediate mixture and blends for 60 minutes. 100 grams of free sulfur meters into the heated intermediate mixture during a 10 minute period and mixes under high shear for another hour. 20 grams of SASOBIT incorporates into the heated intermediate mixture and blends at high shear for an hour, forming the Example 1 PG SEAB.

AASHTO provides standard asphalt binder property testing procedures. The results given in Tables 2-6 are the results of standard tests based upon the American Association of State Highway and Transportation Officials (AASHTO) Performance Graded Asphalt Binder Specification standards. The AASHTO standards guide the determination of the Performance Grade of an asphalt binder using the PG Asphalt Binder Specification system.

AASHTO T 316 provides the procedure for one of ordinary skill in the art to perform a Dynamic Shear Test. The test uses a dynamic shear rheometer to characterize both the viscous and elastic behaviors of each asphalt binder. The complex shear modulus ($G^*$) value is the total resistance to repeated shear deformation. The phase angle ($\delta$) is the lag between applied shear stress and the resulting shear strain. Complex shear modulus divided by phase angle gives the dynamic shear, which is in Pascals.

The Rolling Thin Film Oven Test (RTFOT) simulates short-term aged asphalt when applied to a paving surface. AASHTO T 240 is the procedure for performing the RTFOT tests. For the mass test, a negative mass value indicates a loss of mass between the original and processed samples.

The Pressure Aging Residue (PAR) tests use asphalt binder samples held at 100° C. and 300 psi for 20 hours in a pressure-aging vessel (PAV). The PAV aging of the asphalt binder sample simulates in-service aging over a 7 to 10 year period. A bending beam rheometer (BBR) test provides creep stiffness values. The BBR measures both stiffness and provides an estimate f the value of the curved slope of the master stiffness curve (m) for the aged sample at sixty seconds into the test.

The results of Performance Grade testing on unmodified Example 1-3 as well as base asphalt binders PG 64-22 and PG 64-28 base asphalt materials, the derived RTFOT materials, and the derived PAR materials provides information useful for establishing the AASHTO M 320 Performance Grade and the continuous grade for the materials (listed in Tables 2-6 as the "'True' Performance Grade").

TABLE 2

Performance Grade testing results for PG 64-22 base asphalt.

| Property | AASHTO Test Method | Test Conditions | Units of Measure | Specification limits | Results | | |
|---|---|---|---|---|---|---|---|
| | | | Original Binder | | | | |
| Flash Point | T 48 | — | ° C. | 230 minimum | 318 | | |
| Specific Gravity | T 228 | 15.6° C. | — | — | 1.035 | | |
| Penetration | T 49 | 25° C.; 100 g weight @ 5 seconds | deci-millimeters | — | 69 | | |
| Viscosity | T 316 | 135° C. | Pascal-second | 3.0 maximum | 0.428 | | |
| Dynamic Shear ($G^*/\delta$) | T 315 | — | — | — | $G^*$ | $\delta$ | $G^*/\sin(\delta)$ |
| — | — | 64° C.; 10 radians/second | Kilo Pascals | 1.0 minimum | 1.250 | 88.1 | 1.250 |
| — | — | 70° C.; 10 radians/second | Kilo Pascals | 1.0 minimum | 0.604 | 89.3 | 0.604 |
| | | | After RTFOT | | | | |
| Mass Change | T 240 | — | % | | −0.027 | | |
| — | — | 64° C.; 10 radians/second | Kilo Pascals | 2.2 minimum | 2.610 | 85.4 | 2.600 |
| — | — | 70° C.; 10 radians/second | Kilo Pascals | 2.2 minimum | 1.220 | 87.1 | 2.610 |

TABLE 2-continued

Performance Grade testing results for PG 64-22 base asphalt.

Pressure Aging Residue

| Property | AASHTO Test Method | Test Conditions | Units of Measure | Specification limits | | Results | |
|---|---|---|---|---|---|---|---|
| — | — | 25° C.; 10 radians/second | Kilo Pascals | 5000 maximum | 10000 | 44.6 | 7050 |
| — | — | 19° C.; 10 radians/second | Kilo Pascals | 5000 maximum | 3940 | 51.4 | 3080 |
| Creep Stiffness | T 313 | −12° C. | Mega Pascals | 300 maximum stiffness @ 60 seconds | | 160 | |
| — | — | −12° C. | m value | 0.300 minimum @ 60 seconds | | 0.354 | |
| — | — | −18° C. | Mega Pascals | 300 maximum stiffness @ 60 seconds | | 338 | |
| — | — | −18° C. | m value | 0.300 minimum @ 60 seconds | | 0.290 | |
| 'True' Performance Grade | — | — | ° C. | — | | 64.6-27.1 | |
| AASHTO M 320 Binder Grade | — | — | PG | — | | 64-22 | |
| Effective Temperature Range | — | — | Δ ° C. | — | | 91.7 | |

TABLE 3

Performance Grade testing results for PG 64-28 base asphalt.

| Property | AASHTO Test Method | Test Conditions | Units of Measure | Specification limits | Results | | |
|---|---|---|---|---|---|---|---|
| Original Binder | | | | | | | |
| Flash Point | T 48 | — | ° C. | 230 minimum | 268 | | |
| Specific Gravity | T 228 | 15.6° C. | — | — | 1.037 | | |
| Penetration | T 49 | 25° C.; 100 g weight @ 5 seconds | decimillimeters | — | 89 | | |
| Viscosity | T 316 | 135° C. | Pascal-second | 3.0 maximum | 0.462 | | |
| Dynamic Shear (G*/δ) | T 315 | — | — | — | G* | δ | G*/sin(δ) |
| — | — | 64° C.; 10 radians/second | Kilo Pascals | 1.0 minimum | 1.110 | 85.3 | 1.110 |
| — | — | 70° C.; 10 radians/second | Kilo Pascals | 1.0 minimum | 0.553 | 87.2 | 0.554 |
| After RTFOT | | | | | | | |
| Mass Change | T 240 | — | % | 1.0 maximum | −0.132 | | |
| — | — | 64° C.; 10 radians/second | Kilo Pascals | 2.2 minimum | 2.890 | 79.8 | 2.930 |
| — | — | 70° C.; 10 radians/second | Kilo Pascals | 2.2 minimum | 1.42 | 82.2 | 1.430 |
| Pressure Aging Residue | | | | | | | |
| — | — | 16° C.; 10 radians/second | Kilo Pascals | 5000 maximum | 8810 | 45.6 | 6290 |
| — | — | 19° C.; 10 radians/second | Kilo Pascals | 5000 maximum | 5570 | 48.4 | 4160 |
| Creep Stiffness | T 313 | −18° C. | Mega Pascals | 300 maximum stiffness @ 60 seconds | 209 | | |
| — | — | −18° C. | m Value | 0.300 minimum @ 60 seconds | 0.350 | | |

TABLE 3-continued

Performance Grade testing results for PG 64-28 base asphalt.

| | | | | | |
|---|---|---|---|---|---|
| — | — | −24° C. | Mega Pascals | 300 maximum stiffness @ 60 seconds | 439 |
| — | — | −24° C. | m Value | 0.300 minimum @ 60 seconds | 0.264 |
| 'True' Performance Grade | — | — | ° C. | — | 64.9-30.9 |
| AASHTO M 320 Binder Grade | — | — | PG | — | 64-28 |
| Effective Temperature Range | — | — | Δ ° C. | — | 95.8 |

TABLE 4

Performance Grade testing results for Example 1 PG SEAB.

| Property | AASHTO Test Method | Test Conditions | Units of Measure | Specification limits | Results | | |
|---|---|---|---|---|---|---|---|
| | | | Original Binder | | | | |
| Specific Gravity | T 228 | 15.6° C. | — | — | 1.132 | | |
| Viscosity | T 316 | 135° C. | Pascal-second | 3.0 maximum | 0.260 | | |
| Dynamic Shear (G*/δ) | T 315 | — | — | — | G* | δ | G*/sin(δ) |
| — | — | 82° C.; 10 radians/second | Kilo Pascals | 1.0 minimum | 1.710 | 53.1 | 2.140 |
| — | — | 88° C.; 10 radians/second | Kilo Pascals | 1.0 minimum | 0.831 | 54.9 | 1.020 |
| | | | After RTFOT | | | | |
| Mass Change | T 240 | — | % | — | −0.694 | | |
| — | — | 82° C.; 10 radians/second | Kilo Pascals | 2.2 minimum | 2.180 | 55.3 | 2.660 |
| — | — | 88° C.; 10 radians/second | Kilo Pascals | 2.2 minimum | 1.080 | 57.0 | 1.290 |
| | | | Pressure Aging Residue | | | | |
| — | — | 25° C.; 10 radians/second | Kilo Pascals | 5000 maximum | 5440 | 38.1 | 3360 |
| — | — | 22° C.; 10 radians/second | Kilo Pascals | 5000 maximum | 7830 | 36.4 | 4650 |
| Creep Stiffness | T 313 | −6° C. | Mega Pascals | 300 maximum stiffness @ 60 seconds | 84 | | |
| — | — | −6° C. | m value | 0.300 minimum @ 60 seconds | 0.301 | | |
| — | — | −12° C. | Mega Pascals | 300 maximum stiffness @ 60 seconds | 158 | | |
| — | — | −12° C. | m value | 0.300 minimum @ 60 seconds | 0.275 | | |
| 'True' Performance Grade | — | — | ° C. | — | 83.6-16.2 | | |
| AASHTO M 320 Binder Grade | — | — | PG | — | 82-16 | | |
| Effective Temperature Range | — | — | Δ ° C. | — | 99.8 | | |

TABLE 5

Performance Grade testing results for Example 2 PG SEAB.

| Property | AASHTO Test Method | Test Conditions | Units of Measure | Specification limits | Results | | |
|---|---|---|---|---|---|---|---|
| | | | Original Binder | | | | |
| Specific Gravity | T 228 | 15.6° C. | — | — | 1.131 | | |
| Viscosity | T 316 | 135° C. | Pascal-seconds | 3.0 maximum | 0.228 | | |
| Dynamic Shear (G*/δ) | T 315 | — | — | — | G* | δ | G*/sin(δ) |
| — | — | 82° C.; 10 radians/second | Kilo Pascals | 1.0 minimum | 0.891 | 57.7 | 1.050 |
| — | — | 88° C.; 10 radians/second | Kilo Pascals | 1.0 minimum | 0.450 | 58.4 | 0.528 |
| | | | After RTFOT | | | | |
| Mass Change | T 240 | — | % | — | −0.690 | | |
| — | — | 76° C.; 10 radians/second | Kilo Pascals | 2.2 minimum | 2.730 | 54.8 | 3.350 |
| — | — | 82° C.; 10 radians/second | Kilo Pascals | 2.2 minimum | 1.410 | 55.2 | 1.710 |
| | | | Pressure Aging Residue | | | | |
| — | — | 22° C.; 10 radians/second | Kilo Pascals | 5000 maximum | 7820 | 54.8 | 4890 |
| — | — | 19° C.; 10 radians/second | Kilo Pascals | 5000 maximum | 11300 | 36.6 | 6750 |
| Creep Stiffness | T 313 | −12° C. | Mega Pascals | 300 maximum stiffness @ 60 seconds | 146 | | |
| — | — | −12° C. | m value | 0.300 minimum @ 60 seconds | 0.301 | | |
| — | — | −18° C. | Mega Pascals | 300 maximum stiffness @ 60 seconds | 289 | | |
| — | — | −18° C. | m value | 0.300 minimum @ 60 seconds | 0.265 | | |
| 'True' Performance Grade | — | — | ° C. | — | 79.8-22.2 | | |
| AASHTO M 320 Binder Grade | — | — | PG | — | 76-22 | | |
| Effective Temperature Range | — | — | Δ ° C. | — | 101.7 | | |

TABLE 6

Performance Grade testing results for Example 3 PG SEAB.

| Property | AASHTO Test Method | Test Conditions | Units of Measure | Specification limits | Results | | |
|---|---|---|---|---|---|---|---|
| | | | Original Binder | | | | |
| Specific Gravity | T 228 | 15.6° C. | — | — | 1.139 | | |
| Viscosity | T 316 | 135° C. | Pascal-second | 3.0 maximum | 0.226 | | |
| Dynamic Shear (G*/δ) | T 315 | — | — | — | G* | δ | G*/sin(δ) |
| — | — | 76° C.; 10 radians/second | Kilo Pascals | 1.0 minimum | 1.630 | 77.5 | 1.670 |
| — | — | 82° C.; 10 radians/second | Kilo | 1.0 | 0.614 | 81.1 | 0.622 |

TABLE 6-continued

Performance Grade testing results for Example 3 PG SEAB.

| | | radians/second | Pascals | minimum | | | |
|---|---|---|---|---|---|---|---|
| | | | After RTFOT | | | | |
| Mass Change | T 240 | — | % | | | −0.811 | |
| — | — | 76° C.; 10 radians/second | Kilo Pascals | 2.2 minimum | 3.130 | 66.8 | 3.410 |
| — | — | 82° C.; 10 radians/second | Kilo Pascals | 2.2 minimum | 1.770 | 69.0 | 1.900 |
| | | | Pressure Aging Residue | | | | |
| — | — | 19° C.; 10 radians/second | Kilo Pascals | 5000 maximum | 7970 | 38.3 | 4940 |
| — | — | 16° C.; 10 radians/second | Kilo Pascals | 5000 maximum | 11500 | 36.8 | 6870 |
| Creep Stiffness | T 313 | −12° C. | Mega Pascals | 300 maximum stiffness @ 60 seconds | | 102 | |
| — | — | −12° C. | m value | 0.300 minimum @ 60 seconds | | 0.323 | |
| — | — | −18° C. | Mega Pascals | 300 maximum stiffness @ 60 seconds | | 198 | |
| — | — | −18° C. | m value | 0.300 minimum @ 60 seconds | | 0.297 | |
| 'True' Performance Grade | — | — | ° C. | — | | 79.1-27.3 | |
| AASHTO M 320 Binder Grade | — | — | PG | — | | 76-22 | |
| Effective Temperature Range | — | — | Δ ° C. | — | | 106.4 | |

As shown in Tables 2-6, Performance Grade sulfur-extended asphalt binder Examples 1-3 all demonstrate broader Effective Temperature Ranges versus their respective base asphalts. Examples 1-3 PG SEABs have an Effective Temperature Range of from about 95° C. to about 115° C. Table 4 shows that Example 1 has an Effective Temperature Range of 99.8° C. Table 5 shows Example 2 with an Effective Temperature Range of 101.7° C. Table 2, in contrast, shows that PG 64-22 base asphalt has an Effective Temperature Range of 91.7° C. Examples 1 and 2 have at least an 8° C. broader Effective Temperature Range than the base asphalt binder from which it originates. Example 2 has a 10° C. broader Effective Temperature Range than the original base asphalt binder. Table 3 shows that the PG 64-28 base asphalt binder has an Effective Temperature Range of 95.8° C. whereas Table 6 shows that Example 3 has an Effective Temperature Range of 106.4° C., a difference of more than 9° C. The broader Effective Temperature Range for Examples 1-3 over their base asphalt binders indicates that the Experimental asphalt binder compositions are operable to withstand greater seasonal and regional temperature variations over its service life.

Examples 1-3 have an AASHTO Performance Grade Asphalt Binder Specification M 320 Binder Grade high temperature rating of at least 12° C. greater than the similar rating for the PG-rated base asphalt material from which they comprise. Tables 4 and 5 show that for Examples 1 and 2 the PG Binder Grade high temperature value is 18° C. and 12° C., respectively, greater than the PG 64-22 Binder Grade high temperature given in Table 2. Table 6 shows that for Example 3 the PG Binder Grade high temperature value is 12° C. greater than the PG 64-28 Binder Grade high temperature given in Table 3. The greater high temperature rating indicates that Examples 1-3 are more appropriate for conditions with a higher 7-day average temperature than their base asphalt material components. Examples 1-3 are more suitable for warmer environments than the base asphalts of which they comprise.

The viscosity values of the unmodified PG SEABs Examples 1-3 are all lower than their respective base asphalt materials. The viscosity values are in each Table under "Original Binder". The viscosity value of Example 3 according to Table 6 is less than half the viscosity for the base asphalt material PG 64-28. The decrease in viscosity for Examples 1 and 2 over the base asphalt material PG 64-22 is about 40%. The viscosity values for all three unmodified Examples 1-3 indicates that they are better suited for mixing, including into other materials that create spray coatings and asphalt emulsions, than the respective base asphalt materials. The viscosity of Examples 1-3 is greater than 0.200 and less than 0.300 Pascal-seconds based upon the AASHTO T 316 testing methodology.

Examples 1-3

Tack Coat Bond Shear Strength

Tack coat bond shear strength is the measure of adhesion of a tack coat between asphalt materials, including asphalt-coated aggregate. In the field, a tack coat adheres different layers of asphalt materials to one another, for example, a base layer that acts as a foundation for a roadway and an upper layer engineered to withstand traffic and weather conditions.

Useful comparisons to determine the relative bond strengths of Example 1-3 is comparison to a traditional tack coat adhesive applied as an adhesive emulsion. Table 7 provides the composition of a comparative SS-1h tack coat emulsion composition. The comparative emulsion has a PG 64-22 base asphalt binder as part of its formulation.

TABLE 7

Comparative SS-1h PG 64-22 asphalt emulsion.
SS-1h Comparative Emulsion Composition
(weight % of total composition)

| Components | Composition (wt %) |
|---|---|
| PG 64-22 base asphalt binder | 60.00 |
| REDICOTE E-7000 | 2.90 |
| ALCOGUM L 265 | 0.20 |
| Sodium Hydroxide (50 wt %) | 0.15 |
| Water (to 100%) | 36.75 |
| PH of solution | 11.5 |
| Stability of Emulsion (24 h) | Excellent |

Another useful comparison for the properties of Examples 1-3 is in relation to the direct "hot tack" application of the unmodified PG base asphalt material (PG 64-22). Neat "hot tack" binders find use in warmer climates where lower seasonal temperatures occur infrequently.

The procedure for the Tack Coat Bond Shear Test is based upon the procedure provided in Sholar, Gregory A., et al., *Preliminary Investigation of a Test Method to Evaluate Bond Strength of Bituminous Tack Coats*, Research Report FL/DOT/SMO/02-459, State of Florida (October 2002) ("Sholar"). A modified version of the test is useful in determining the strength of the tack coat adhesive for interfacial shear.

The Tack Coat Bond Shear Test determines the bond shear strength of the tack coat adhesive applied between two hot mix asphalt layers. Sample preparation, which is part of the Tack Coat Bond Shear Test, includes the step of laying down a first layer made of Traffic level C SUPERPAVE hot mix at 316° F. The hot mix contains a large proportion of Georgia granite and a small proportion of sand. The asphalt binder content of the first layer is about 5%. Compaction of the first layer occurs at 296° F. with a gyratory compactor such that the air voids are in a range of about 3-5% by volume. The first layer conditions overnight to achieve an ambient temperature condition (~77° F.).

Sample preparation also includes the step of applying a sample of each Example 1-3, the comparative SS-1h tack coat emulsion composition, and the comparative PG 64-22 base asphalt material to the first layer. The step includes applying each tack coat sample to coat the first layer at a volumetric spread of about 0.03 gallons solids per square yard. Application of Examples 1-3 and the SS-1h Comparative Emulsion Composition occurs at 180° F. Application of the PG 64-22 base asphalt comparative as a "hot tack" occurs at 250° F. All tack coat samples condition for 2 hours on the first layer before application and compaction of a second layer on top of the tack coats.

Sample preparation also includes the step of laying down a second layer made of Friction course mix (FC-6) Traffic level C SUPERPAVE hot mix. The hot mix for the second layer contains a large proportion of Georgia granite and a small proportion of sand. Compaction of the second layer occurs such that the air voids are in a range of about 6-8% by volume. The combined first layer/tack coat/second layer conditions overnight to achieve room temperature.

Sample preparation also includes the steps of taking core samples of the first layer/tack coat/second layer for each tack coat composition and then preparing the core samples for shear testing. Each core sample conditions at one of the three testing temperatures (15° C., 25° C., 40° C.) for six hours before the shear testing.

Figure 1:
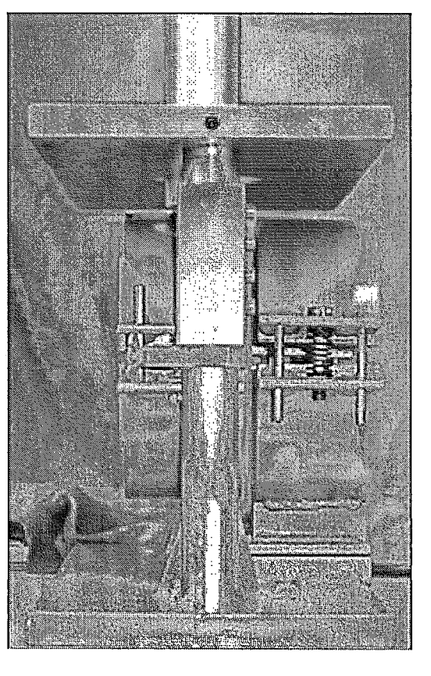
FIG. 1 is an image of the Marshall Testing machine with a specialized sample device useful for performing the Tack Coat Bond Shear Test.

A Marshall Testing machine with a specialized sample device runs the shearing test for each core sample. See FIG. 1 for an image of the Marshall Testing machine. The rate of load applied to each core sample is 2 inches per minute. The Marshall Testing machine operates on a strain-control basis. The gap between the shearing plates is 3/16ths of an inch.

The temperatures for the Tack Coat Bond Shear Test evaluation are different from the temperatures given for the Sholar procedure. The three temperatures show tack coat adhesion performance across a broader temperature spectrum whereas the Sholar procedure is only for a single temperature. A broader temperature spectrum reflects greater temperature service range. High bond strength at normal ambient conditions (25° C.) is desirable; however, bond strength at lower temperatures is also preferred such that the adhesive has a broad operating temperature range. Tack coats that traditionally perform well at higher temperatures typically do not perform as well at lower temperatures due to premature fracturing or cracking.

Table 8 shows the results of the Tack Coat Bond Shear Test on Examples 1-3, the comparative SS-1h tack coat emulsion composition, and the comparative PG 64-22 base asphalt material applied as a "hot tack". The unit of measure for tack coat adhesion is pounds per square inch (psi).

TABLE 8

Tack Coat Bond Shear Strength test results for Examples 1-3,
SS-1h emulsion, and PG 64-22 "hot tack".
Tack Coat Bond Shear Strength (psi)

| Material | Test Temperature (° C.) | | |
|---|---|---|---|
| | 15° C. | 25° C. | 40° C. |
| PG 64-22 base asphalt | 350.2 | 169.0 | 53.9 |
| SS-1h comparative emulsion | 411.8 | 225.7 | 60.0 |
| Example 1 | 456.4 | 226.0 | 51.0 |
| Example 2 | 383.7 | 211.9 | 51.0 |
| Example 3 | 410.1 | 185.9 | 53.7 |

As shown in Table 8, Examples 1-3 outperform the "hot tack" PG 64-22 base asphalt material at the 15° C. and 25° C. testing temperatures and are similar at the 40° C. testing temperature. This is unexpected as all the Examples are higher temperature Performance Graded materials than the PG 64-22 base asphalt material. Traditionally, higher temperature rated materials do not perform as well in lower temperature ranges; however, the Tack Coat Bond Shear Strength results indicate that the higher temperature rated Examples 1-3 outperform the neat PG 64-22 material at the lower and middle test temperature. Example 1 shows a 30% improvement in bond shear strength over base asphalt PG 64-22 at 15° C. and a 33% improvement at 25° C.

The Tack Coat Bond Shear Strength testing also shows that Examples 1-3 compare favorably with the performance of the comparative SS-1h tack coat emulsion composition. In fact, Example 1 outperforms SS-1h at both the 15° C. and 25° C. testing conditions. These results directly show the usefulness of the PG SEABs in tack coating compositions.

At the Tack Coat Bond Shear Strength testing temperature of 15° C., Examples 1-3 have a tack coat bond strength values in a range of about 380 psi to about 500 psi. At the Tack Coat Bond Shear Strength testing temperature of 25° C., Examples 1-3 have a tack coat bond strength values in a range of about 180 psi to about 250 psi.

Examples 4-6

Performance Grade Asphalt Emulsion

An Example Performance Grade (PG) sulfur-extended asphalt binder (SEAB) emulsion (E)—Example 4—is a combination of Example 1 PG SEAB, a viscosifier (BERMACOLL EM 7000 FQ), an emulsifier (REDICOTE E-7600), a saponification agent (NaOH) and water. The values of Table 9 are in weight percent of the total PG SEABE composition.

TABLE 9

Composition of Example 4 PG SEABE.
Example 4 Performance Grade Emulsion Composition
(weight % of total composition)

| Components | Composition (wt %) |
|---|---|
| Example 1 PG SEAB | 60.00 |
| REDICOTE E-7600 | 2.90 |
| BERMACOLL EM 7000 FQ | 0.20 |
| Sodium Hydroxide (50 wt %) | 0.15 |
| Water (to 100%) | 36.75 |
| pH of solution | 11.7 |
| Stability of Emulsion (24 h) | Excellent |

The temperature of the Example 4 PG SEABE components and intermediate mixtures do not exceed 275° F. during any part of the blending process. For Example 4, 600 grams of Example 1 PG SEAB heats in a suitable container to a temperature that does not exceed 275° F. A laboratory colloid mill mixes 29.0 grams of emulsifier, about 367.5 grams of water and about 1.5 grams of saponification agent at about 115° F. After adding the heated Example 1 PG SEAB to the emulsifier/base solution, the intermediate mixture blends in the colloid mill for 5 minutes at a high setting. The Example 1/emulsion/base intermediate mixture passes to a metal container containing 2 grams of the viscosifier, where it is slowly stirred to fully incorporate the material and form Example 4 PG SEABE.

Both AASHTO and American Society for Testing and Materials (ASTM) have several testing methodologies for Performance Grade asphalt emulsions and resultant residues from the emulsions. ASTM D 997 and AASHTO M 140 are specifications for testing anionic asphalt emulsions.

A modified version of ASTM D 7497-09 ("Standard Practice for Recovering Residue from Emulsified Asphalt using Low Temperature Evaporative Technique") known to those of ordinary skill in the art as the "TxDoT evaporation method" (Texas Department of Transportation), "TxDoT Evaporation Recovery Procedure" and ASTM D 7497 "Method B", produces a Performance Grade asphalt emulsion residue from the Example 4 composition. The TxDoT Evaporation Recovery Procedure provides the advantages of taking less time to produce a residue, simulates accurately how an asphalt emulsion breaks and dries after field application, and prevents elevated temperatures from damaging polymers and other modifiers that are present in modern asphalt emulsion compositions.

To the best of Applicants' knowledge as of the time of this Application, neither ASTM nor AASHTO have formally approved "Method B" as a standard practice or procedure; however, several references describe the TxDoT Evaporation Recovery Procedure and its use for generating asphalt emulsion residues. The TxDoT Evaporation Recovery Procedure uses a silicone baking mat for drawing a sample of asphalt emulsion to a thickness of 0.015" across the surface of the mat. A forced-air convection oven warms the asphalt emulsion sample to 140° F. for a period of approximately six hours. At the end of the period, the asphalt emulsion residue is ready for testing. One of ordinary skill in the art recognizes the necessary equipment and other processes for performing this variant of the ASTM D 7497 procedure. See Laurand Lewandowski, "Performance Based Emulsion Testing—Residue Testing", Presentation (for AEMA-ARRA-ISSA Annual Meeting), slide 17 (dated Mar. 5, 2010) (PRI Asphalt Tech., Inc.).

ASTM and AASHTO asphalt emulsion residual testing procedures describe the testing procedures for the residues of the PG SEADEs. The temperature at which the stiffness of the asphalt emulsion residue exceeds 300 MPa is the limiting stiffness temperature. The test uses a bending beam rheometer. The test results shown in Table 10 are for both the Performance Grade asphalt emulsion Example 4 and its asphalt emulsion residue formed using the TxDoT Evaporation Recovery Procedure.

TABLE 10

Testing results for Example 4 PG SEABE and its residue.

| Property | Test Method | Test Conditions | Units of Measure | Result |
|---|---|---|---|---|
| Example 4 Liquid Emulsion ||||| 
| Viscosity (Saybolt Furol) | ASTM D 244 | 77° F. | seconds | 303 |
| Storage Stability | ASTM D 244 | 24 hours | % | 0.0 |
| Sieve Test | ASTM D 244 | — | % | 0.03 |
| Example 4 Residue Testing ||||| 
| Residue | ASTM D 6997 | — | weight % | 62.8 |
| Penetration | ASTM D 5 | 25° C. | decimillimeters | 71 |
| Ductility | ASTM D 113 | 5 cm/min. @ 25° C. | centimeters | 10 |
| Solubility in TCE | ASTM D 2042 | — | % | 92.5 |
| Dynamic Shear (G*/δ) | AASHTO T 315 | 82° C.; 1.0 minute; 10 radians/second | kiloPascals | 1.550 |
| — | — | 88° C.; 1.0 minute; 10 radians/second | kiloPascals | 0.645 |
| Limiting Stiffness Temperature | AASHTO T 315 | — | ° C. | 85.0 |

Table 10 shows that Performance Grade asphalt emulsion Example 4 is a stable PG SEAB emulsion. No solids are present in the bottom of the testing vessel after a 24-hour settling period. The storage stability for the Performance Grade asphalt emulsion is a surprising result given the amount of free sulfur in the Performance Grade sulfur-extended asphalt binder, which is a major component of the Performance Grade asphalt emulsion. Those of ordinary skill in the art know that free sulfur is not miscible in water at more than a few percent, so suspending the amount included in the Performance Grade sulfur-extended asphalt binder is unexpected.

The dynamic shear value of 1.550 kPa at 82° C. of the Performance Grade asphalt emulsion Example 4 residual material indicates that the emulsion residual material is useful as a trackless tack coating. The residue material shows no tackiness at 25° C. The dynamic shear value indicates that the Example 4 emulsion residual material does not easily deform under shear stress after application to a surface. The resistance to deformation implies that the emulsion residue performs well in holding different asphalt binder/aggregate layers together without permitting one to slough away from the other after application.

Example 2 and 3 also make PG SEABEs that, unlike Example 4, are short-lived. Tables 11 and 12 shows the formulations for Examples 5 and 6, which are emulsions based upon Examples 2 and 3, respectively. The values of Tables 11 and 12 are in weight percent of the total PG SEABE composition.

TABLE 11

Composition of Example 5 PG SEABE.
Example 5 Performance Grade Emulsion Composition
(weight % of total composition)

| Components | Composition (wt %) |
|---|---|
| Example 2 PG SEAB | 60.00 |
| REDICOTE E-7600 | 2.90 |
| BERMACOLL EM 7000 FQ | 0.20 |
| Sodium Hydroxide (50 wt %) | 0.15 |
| Water (to 100%) | 36.75 |
| pH of solution | 11.8 |
| Stability of Emulsion (24 h) | Approx. 3 hours |

TABLE 12

Composition of Example 5 PG SEABE.
Example 6 Performance Grade Emulsion Composition
(weight % of total composition)

| Components | Composition (wt %) |
|---|---|
| Example 3 PG SEAB | 60.00 |
| REDICOTE E-7600 | 2.90 |
| BERMACOLL EM 7000 FQ | 0.20 |
| Sodium Hydroxide (50 wt %) | 0.15 |
| Water (to 100%) | 36.75 |
| pH of solution | 11.2 |
| Stability of Emulsion (24 h) | Approx. 4 hours |

The residues of Examples 5 and 6 form trackless tack coats upon breaking. The residue materials, similar to the residue of Example 4, show no tackiness at 25° C. Example 5 contains Example 2, a PG SEAB that does not include the non-aqueous acid. Example 6 contains Example 3, a PG SEAB that does not include the saturated-backbone polymer modifier. Example 4 contains Example 1, which includes free sulfur, the non-aqueous acid, the polymer modifier, and the linear alkane material. Examples 5 and 6 can be used where mixing occurs proximate to the location of application.

What is claimed is:

1. A Performance Grade sulfur-extended asphalt binder emulsion comprising:
    a viscosifier in a range of from 0.1% to 3% by total weight of the emulsion;
    an emulsifier in a range of from 0.1% to 5% by total weight of the emulsion;
    a base aqueous solution in a range of from 21.7% to 89.8% by total weight of the emulsion; and
    a Performance Grade sulfur-extended asphalt binder in a range of from 10% to 70% by total weight of the emulsion, where the Performance Grade sulfur-extended asphalt binder comprises a free sulfur in a range of from 10% to 50%, a linear alkane material in a range of from 0.1% to 5%, and a base asphalt in a range of from 38% to 89.9% by total weight of the Performance Grade sulfur-extended asphalt binder, where the Performance Grade sulfur-extended asphalt binder is a Performance Grade asphalt binder per AASHTO Performance Graded Asphalt Binder Specification M 320-10;
    where the Performance Grade sulfur-extended asphalt binder emulsion has a storage stability of at least 3 hours as determined using the ASTM D 244 testing method.

2. The asphalt emulsion of claim 1 where the viscosifier includes a non-ionic cellulose-based rheology modifier.

3. The asphalt emulsion of claim 1 where the emulsifier includes a slow-setting anionic emulsifier.

4. The asphalt emulsion of claim 1 further comprising a saponification agent in a range of from about 0.1% to about 0.3% by total weight of the emulsion.

5. The asphalt emulsion of claim 4 where the saponification agent is an aqueous solution of sodium hydroxide.

6. The asphalt emulsion of claim 1 where the asphalt emulsion has a pH value in a range of from about 9 to about 12.

7. The asphalt emulsion of claim 1 where the linear alkane material is a Fischer-Tropsch wax.

8. The asphalt emulsion of claim 1 where the linear alkane material has a carbon count equal to or greater than 40 and has a melting temperature of less than or equal to about 239° F.

9. The asphalt emulsion of claim 1 where the linear alkane material has a carbon count in a range of from about 18 to about 150 and has a melting temperature in the range of from about 80° F. to about 239° F.

10. The asphalt emulsion of claim 1 where the base asphalt is a Performance Grade asphalt per AASHTO Performance Graded Asphalt Binder Specification M 320-10.

11. The asphalt emulsion of claim 10 where the base asphalt includes a PG 64-22 asphalt.

12. The asphalt emulsion of claim 10 where the base asphalt includes a PG 64-28 asphalt.

13. The asphalt emulsion of claim 1 where the asphalt binder further comprises a saturated-backbone polymer modifier in a range of from about 0.1% to about 5% by total weight of the asphalt binder composition.

14. The asphalt emulsion of claim 13 where the saturated-backbone polymer modifier further comprises reactive moieties selected from the group consisting of primary and secondary alcohols, primary and secondary amines, acid anhydrides, epoxides, unsaturated carbons and combinations thereof.

15. The asphalt emulsion of claim 13 where the saturated-backbone polymer modifier is at least partially derived from the polymerization of glycidyl methacrylate.

16. The asphalt emulsion of claim 1 where the asphalt binder further comprises a non-aqueous acid in range of from about 0.1% to about 2% by total weight of the asphalt binder composition.

17. The asphalt emulsion of claim 16 where the non-aqueous acid is a polyphosphoric acid having a concentration in a range of from about 95% to about 118% phosphoric acid concentration equivalents.

18. The asphalt emulsion of claim 1 where the Performance Grade sulfur-extended asphalt binder has an Effective Temperature Range of from about 95° C. to about 115° C.

19. The asphalt emulsion of claim 1 where the Performance Grade sulfur-extended asphalt binder has an Effective Temperature Range that is at least 8° C. broader than the Effective Temperature Range for the base asphalt.

20. The asphalt emulsion of claim 1 where the Performance Grade sulfur-extended asphalt binder has an AASHTO Performance Grade Asphalt Binder Specification M 320-10 Binder Grade high temperature value of at least about 12° C.

greater than the high temperature rating for the base asphalt used to create the Performance Grade sulfur-extended asphalt binder.

21. The asphalt emulsion of claim 1 where the Performance Grade sulfur-extended asphalt binder has a viscosity value of at least about 35% lower than the viscosity value of the base asphalt used to create the Performance Grade sulfur-extended asphalt binder as determined using the AASHTO T 316 test method.

22. The asphalt emulsion of claim 1 where the Performance Grade sulfur-extended asphalt binder has a viscosity value in the range of from about 0.200 Pascal-seconds to about 0.300 Pascal-seconds as determined using the AASHTO T 316 test method.

23. The asphalt emulsion of claim 1 having a storage stability value of 0.0 for a 24-hour period as determined using the ASTM D 244 testing method.

24. A Performance Grade sulfur-extended asphalt binder composition comprising: a free sulfur in a range of from 10% to 50% by total weight, a linear alkane material in a range of from 0.1% to 5% by total weight, and a base asphalt in a range of from 38% to 89.9% by total weight, each by total weight of the Performance Grade sulfur-extended asphalt binder composition, where the Performance Grade sulfur-extended asphalt binder is a Performance Grade asphalt binder per AASHTO Performance Graded Asphalt Binder Specification M 320-10.

25. The asphalt binder of claim 24 where the linear alkane material is a Fischer-Tropsch wax.

26. The asphalt binder of claim 24 where the linear alkane material has a carbon count equal to or greater than 40 and has a melting temperature of less than or equal to about 239° F.

27. The asphalt binder of claim 24 where the linear alkane material has a carbon count in a range of from about 18 to about 150 and has a melting temperature in the range of from about 80° F. to about 239° F.

28. The asphalt binder of claim 24 where the base asphalt is a Performance Grade asphalt per AASHTO Performance Graded Asphalt Binder Specification M 320-10.

29. The asphalt binder of claim 28 where the base asphalt includes a PG 64-22 asphalt.

30. The asphalt binder of claim 28 where the base asphalt includes a PG 64-28 asphalt.

31. The asphalt binder of claim 24 further comprises a saturated-backbone polymer modifier in a range of from about 0.1% to about 5% by total weight of the asphalt binder composition.

32. The asphalt binder of claim 31 where the saturated-backbone polymer modifier further comprises reactive moieties selected from the group consisting of primary and secondary alcohols, primary and secondary amines, acid anhydrides, epoxides, unsaturated carbons and combinations thereof.

33. The asphalt binder of claim 31 where the saturated-backbone polymer modifier is at least partially derived from the polymerization of glycidyl methacrylate.

34. The asphalt binder of claim 24 further comprising a non-aqueous acid in a range of from about 0.1% to about 2% by total weight of the asphalt binder composition.

35. The asphalt binder of claim 34 where the non-aqueous acid is a polyphosphoric acid having a concentration in a range of from about 95% to about 118% phosphoric acid concentration equivalents.

36. The asphalt binder of claim 24 having an Effective Temperature Range of from about 95° C. to about 115° C.

37. The asphalt binder of claim 24 having an Effective Temperature Range in a range of from 8° C. to 10° C. broader than the Effective Temperature Range for the base asphalt.

38. The asphalt binder of claim 24 having an AASHTO Performance Grade Asphalt Binder Specification M 320-10 Binder Grade high temperature value in a range of from 12° C. to 18° C. greater than the high temperature rating for the base asphalt.

39. The asphalt binder of claim 24 having a viscosity value that is about 40% to about 50% lower than the viscosity value of the base asphalt used to create the asphalt binder as determined using the AASHTO T 316 test method.

40. The asphalt binder of claim 24 having a viscosity value is in the range of from about 0.200 Pascal-seconds to 0.300 Pascal-seconds as determined using the AASHTO T 316 test method.

41. A tack coat comprising a Performance Grade sulfur-extended asphalt binder, which comprises a free sulfur in a range of from 10% to 50%, a linear alkane material in a range of from 0.1% to 5%, and a base asphalt in a range of from 38% to 89.9% by total weight of the asphalt binder.

42. The tack coat of claim 41 having a tack coat bond shear strength value in a range of from 370 psi to 475 psi as determined using the Tack Coat Bond Shear Test as measured at 15° C.

43. The tack coat of claim 41 having a tack coat bond shear strength value of at least 30% greater than the tack coat bond shear strength value of the base asphalt as determined using the Tack Coat Bond Shear Test as measured at 15° C.

44. The tack coat of claim 41 having a tack coat bond shear strength value in a range of from 175 psi to 250 psi as determined using the Tack Coat Bond Shear Test as measured at 25° C.

45. The tack coat of claim 41 having a tack coat bond shear strength value of at least 33% greater than the tack coat bond shear strength value of the base asphalt used to create the Performance Grade sulfur-extended asphalt binder as determined using the Tack Coat Bond Shear Test as measured at 25° C.

46. The tack coat of claim 41 where the tack coat is operable as a trackless tack coat at 25° C.

47. The tack coat of claim 41 does not include the non-aqueous acid.

48. The tack coat of claim 41 does not include the saturated-backbone polymer modifier.

* * * * *